United States Patent [19]

Ogawa et al.

[11] Patent Number: 5,357,754
[45] Date of Patent: Oct. 25, 1994

[54] CATALYST DETERIORATION-DETECTING DEVICE FOR INTERNAL COMBUSTION ENGINES

[75] Inventors: Ken Ogawa; Atsushi Kato; Yoshikazu Oshima, all of Wako, Japan

[73] Assignee: Honda Giken Kogyo Kabushiki Kaisha, Tokyo, Japan

[21] Appl. No.: 122,362

[22] Filed: Sep. 17, 1993

[30] Foreign Application Priority Data

Sep. 18, 1992 [JP] Japan .................... 4-275405

[51] Int. Cl.⁵ ............................................. F02D 41/14
[52] U.S. Cl. .................................. 60/276; 60/285; 123/691
[58] Field of Search .................. 60/274, 276, 285; 123/672, 691, 692

[56] References Cited

U.S. PATENT DOCUMENTS

| | | | |
|---|---|---|---|
| 4,007,589 | 2/1977 | Neidhard | 60/274 |
| 4,251,989 | 2/1981 | Norimatsu | 60/276 |
| 4,622,809 | 11/1986 | Abthoff | 60/274 |
| 4,912,926 | 4/1990 | Kumagai | 60/276 |
| 5,259,189 | 11/1993 | Baier | 60/274 |

Primary Examiner—James C. Yeung
Assistant Examiner—Daniel J. O'Connor
Attorney, Agent, or Firm—Nikaido, Marmelstein, Murray & Oram

[57] ABSTRACT

A catalyst deterioration-detecting device for an internal combustion engine has at least one catalyst arranged in an exhaust passage of the engine, for purifying exhaust gases emitted from the engine, first and second exhaust component concentration sensors arranged in the exhaust passage upstream and downstream of the catalyst, respectively. The catalyst deterioration-detecting device calculates an average value of an output value from the second exhaust component concentration sensor, calculates an output fluctuation width with respect to the average value, based on the output value from the second exhaust component concentration sensor, and determines whether the catalyst is deteriorated, based on the calculated average value and the calculated output fluctuation width. The detection of the catalyst deterioration is carried out when the engine is in a predetermined operating condition defined by engine temperature, engine speed and engine load.

9 Claims, 8 Drawing Sheets

CATALYST DETERIORATION-DETECTING DEVICE FOR INTERNAL COMBUSTION ENGINES

BACKGROUND OF THE INVENTION

1. Field of the Invention

This invention relates to a device for detecting deterioration of a catalyst (catalytic convertor) of an internal combustion engine, and more particularly to a device for detecting deterioration of a catalyst arranged in the exhaust system of the engine by the use of an output from an exhaust component concentration sensor downstream of the catalyst or the like.

2. Prior Art

Conventional catalyst deterioration-detecting devices for internal combustion engines include a device which is disclosed in Japanese Provisional Patent Publication (Kokai) No. 2-30915. According to this prior art, a three-way catalyst is arranged in an exhaust system of an internal combustion engine, and two oxygen concentration sensors (hereinafter referred to as "the upstream O2 sensor" and "the downstream O2 sensor" as exhaust component concentration sensors are arranged upstream and downstream of the three-way catalyst, respectively. These O2 sensors have such an output characteristic that their output levels thereof are inverted as the air-fuel ratio of a mixture supplied to the engine changes across a stoichiometric air-fuel ratio. The device according to the prior art detects deterioration of the three-way catalyst, based on a time period elapsed from the time the air-fuel ratio of the mixture changes to a rich value with respect to the stoichiometric air-fuel ratio to the time the output from the downstream O2 sensor is correspondingly inverted from a lean side to a rich side with respect to a reference output value, or a time period elapsed from the time the air-fuel ratio changes to a lean value with respect to the stoichiometric air-fuel ratio to the time the sensor output is correspondingly inverted from a rich side to a lean side with respect to the reference output value.

Figure 1:
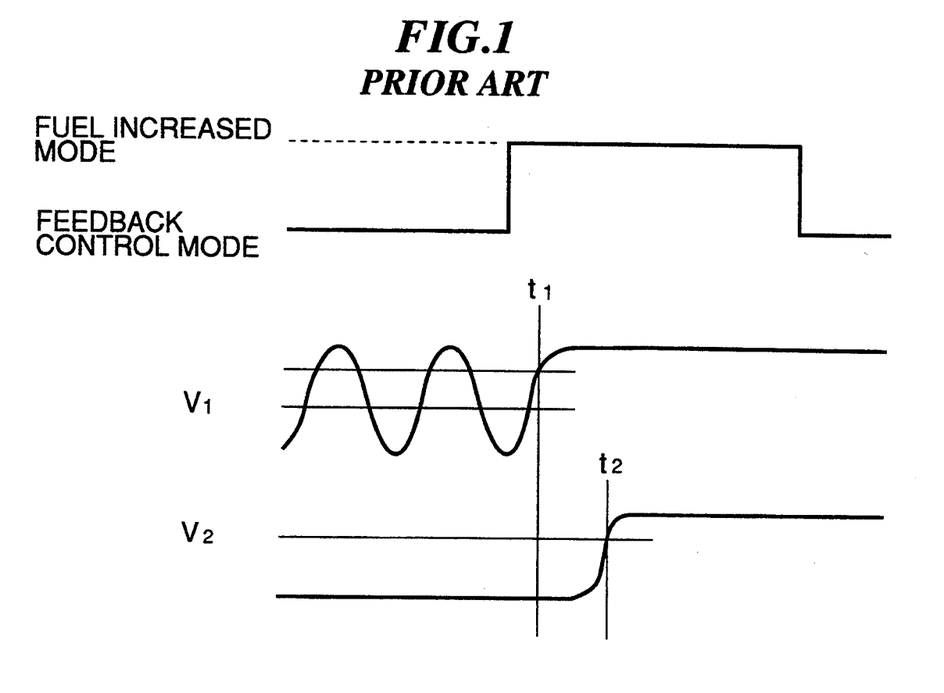
FIG. 1 is a timing chart useful in explaining a method of detecting deterioration of a catalyst according to the prior art.

More specifically, as shown in FIG. 1, for example, a time period is measured, which elapses from a time point t1 the output V1 from the upstream O2 sensor changes to the rich side to a time point t2 the output V2 from the downstream O2 sensor is correspondingly inverted from the lean side to the rich side. Based upon the thus measured time period, it is determined whether the three-way catalyst is deteriorated.

This deterioration-detecting technique is based upon the following ground:

A three-way catalyst in general has a so-called oxygen storage effect that it takes in oxygen when the air-fuel ratio lies on the lean side, whereas it takes in CO and HC in exhaust gases from the engine when the air-fuel ratio lies on the lean side. As the oxygen storage effect is greater, a time difference between a time point of a change in the air-fuel ratio of exhaust gases in the exhaust system upstream of the catalyst and a time point of a corresponding change in the air-fuel ratio of exhaust gases downstream of the catalyst becomes larger. The above-mentioned measured time period represents this time difference. The oxygen storage effect becomes smaller as the degree of deterioration of the catalyst is higher, so that the measured time period becomes shorter. Therefore, when the measured time period is shorter than a predetermined time period, it can be judged that the oxygen storage effect is degraded, i.e. the catalyst is deteriorated.

According to the prior art, the detection of the catalyst deterioration is carried out when the engine is in a condition where the supply of fuel is increased or when the engine is under fuel cut so that a change in the output characteristic of the upstream O2 sensor does not affect the output from the downstream O2 sensor, thereby making it possible to detect deterioration of the catalyst with high accuracy.

However, the prior art device has the disadvantage that the detection of the catalyst deterioration has to be carried out only when the engine is in a particular operating condition other than an air-fuel ratio feedback control condition, such as a condition where the fuel supply is increased, and a condition where fuel cut is carried out, and further, when the catalyst deterioration detection is carried out, the air-fuel ratio of the mixture supplied to the engine has to be set to a rich value or a lean value with respect to the stoichiometric air-fuel ratio. Therefore, in carrying out the catalyst deterioration detection, it is necessary to wait until the engine enters such a particular operating condition or temporarily interrupt the air-fuel ratio feedback control. Thus, the catalyst deterioration detection cannot be carried out concurrently with the air-fuel ratio feedback control. Moreover, the exhaust emission characteristics may be degraded during the catalyst deterioration detection due to the temporary interruption of the air-fuel ratio.

Besides, according to the prior art, it takes a considerable time to complete the catalyst deterioration detection, since the time period before occurrence of the inversion of the output from the downstream O2 sensor has to be measured.

SUMMARY OF THE INVENTION

It is the object of the invention to provide a catalyst deterioration-detecting device for internal combustion engines, which is capable of carrying out detection of the catalyst deterioration within a short time and concurrently with the air-fuel ratio feedback control, without a degradation in the exhaust emission characteristics.

To attain the above object, the present invention provides a catalyst deterioration-detecting device for an internal combustion engine having an exhaust passage, at least one catalyst means arranged in the exhaust passage for purifying exhaust gases emitted from the engine, a first exhaust component concentration sensor arranged in the exhaust passage upstream of the catalyst means, for detecting concentration of a specific component in the exhaust gases, a second exhaust component concentration sensor arranged in the exhaust passage downstream of the catalyst means, for detecting concentration of the specific component, operating condition-detecting means for detecting operating conditions of the engine, desired air-fuel ratio-calculating means for calculating a desired air-fuel ratio of a mixture supplied to the engine in response to operating conditions of the engine detected by the operating condition-detecting means, correction means for correcting the air-fuel ratio based on an output value from the second exhaust component concentration sensor, and control means for feedback-controlling an air-fuel ratio of a mixture supplied to the engine to the corrected desired air-fuel ratio in response to the concentration of the specific component detected by the first exhaust component concentration sensor.

The catalyst deterioration-detecting device according to the invention comprises:

average value-calculating means for calculating an average value of the output value from the second exhaust component concentration sensor;

fluctuation width-calculating means for calculating an output fluctuation width with respect to the average value, based on the output value from the second exhaust component concentration sensor; and deterioration-determining means for determining whether the catalyst means is deteriorated, based on the average value calculated by the average value-calculating means and the output fluctuation width calculated by the fluctuation width-calculating means.

Figure 2:
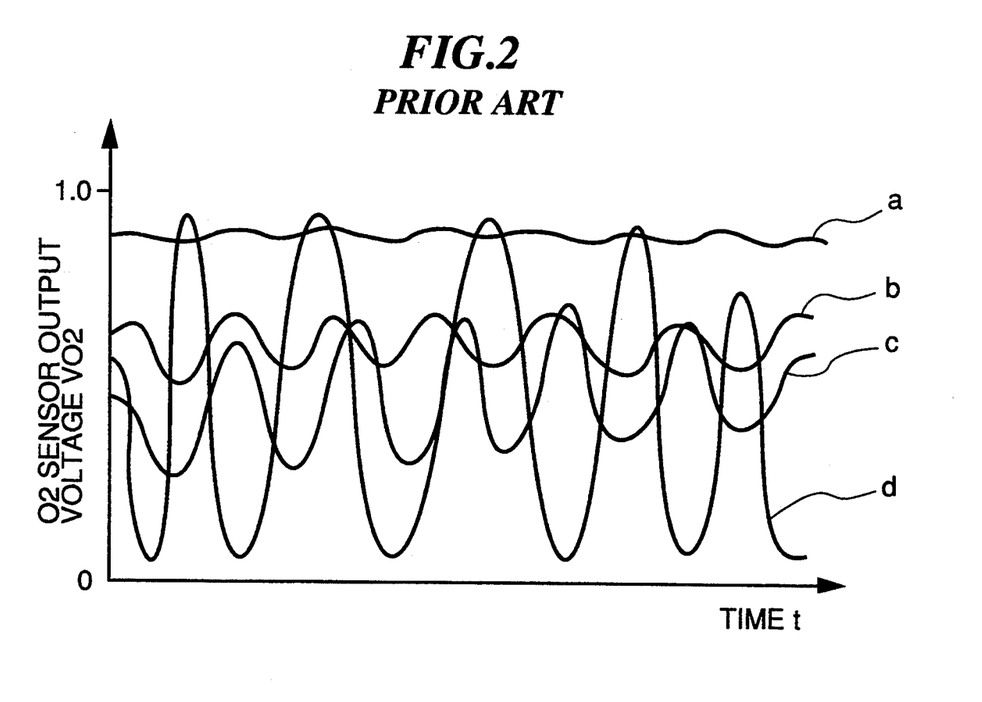
FIG. 2 is a diagram showing the relationship between the degree of deterioration of a catalyst and changes in an output from an O2 sensor downstream of the catalyst.

First, the principle of the manner of detection of the catalyst deterioration employed by a catalyst deterioration-detecting device according to the invention will be explained hereinbelow:

FIG. 2 shows the relationship between the degree of deterioration of a catalyst and changes in an output from an O2 sensor (second exhaust component concentration sensor) downstream of the catalyst. In the figure, the curves a, b, and c represent changes in the output from the downstream O2 sensor obtained, respectively, when the catalyst is a new one just put into use, when the catalyst has been used in a vehicle which has traveled about 80,000 km, and when the catalyst has been used in a vehicle which has traveled about 160,000 km. The curve d represents a change in the O2 sensor output obtained by supplying exhaust gases (feed gas) directly to the O2 sensor without passing through the catalyst.

As is learned from FIG. 2, in the case of the new catalyst, the O2 sensor shows a relatively high average output value with a very small fluctuation width. On the other hand, in the case of the catalyst after traveling about 80,000 km, the O2 sensor output shows an average value which is lower than the curve a in the case of the new catalyst and has a larger fluctuation width than the curve a. In the case of the catalyst after traveling about 160,000 km, the O2 sensor output shows a still lower average value with a further increased fluctuation width. In the case where the feed gas is directly supplied to the O2 sensor, the average output value from the O2 sensor lowers to a level about half as high as the level in the case of the new catalyst, and has a very large fluctuation width.

The average output value from the O2 sensor is considered to correspond to oxygen partial pressure prevailing downstream of the catalyst, i.e. the oxidizing capacity of the catalyst. Therefore, the output fluctuation width of the O2 sensor can be considered to correspond to a degree of change in the oxygen storage capacity of the catalyst. That is, as shown in FIG. 2, as the oxidizing capacity of the catalyst lowers, the average output value from the O2 sensor becomes lower, and as the degree of deterioration of the catalyst increases, the oxygen storage capacity of the catalyst become lower so that the output fluctuation width of the O2 sensor increases.

The present invention is based on the above described principle, and utilizes an average value of an output from a second exhaust component concentration sensor downstream of a catalyst and a fluctuation width thereof, for evaluation of the degree of deterioration of the catalyst.

More advantageously, a first exhaust component concentration sensor which has an output characteristic that an output level thereof is substantially proportional to the concentration of a specific component in the exhaust gases is arranged upstream of the catalyst. By carrying out air-fuel ratio feedback control in response to an output from the first exhaust component concentration sensor, an output from the second exhaust component concentration sensor downstream of the catalyst in an initial condition (non-deteriorated condition) can be made "flat", i.e. have a small output fluctuation width. If on this occasion, detection of the catalyst deterioration is carried out by the use of the output average value from the second exhaust component concentration sensor and the fluctuation width thereof, the degree of deterioration of the catalyst can be accurately evaluated.

Therefore, according to the catalyst deterioration-detecting device according to the invention constructed as stated before, whether the catalyst is deteriorated is determined based on the average output value from the second exhaust emission component concentration sensor calculated by the average value-calculating means and the output fluctuation width thereof calculated by the fluctuation width-calculating means, to thereby enable carrying out detection of the catalyst deterioration concurrently with execution of the air-fuel ratio feedback control.

Preferably, detection of deterioration of the catalyst means is carried out when an operating condition of the engine detected by the operating condition-detecting means is a predetermined operating condition.

More preferably, the operating condition-detecting means at least comprises coolant temperature-detecting means for detecting coolant temperature of the engine, catalyst temperature-detecting means for detecting temperature of the catalyst means, engine speed-calculating means for detecting rotational speed of the engine, and engine load-detecting means for detecting load on the engine.

Specifically, for example, the detection of deterioration of the catalyst means is carried out when the detected coolant temperature of the engine exceeds a first predetermined value, the detected temperature of the catalyst means exceeds a second predetermined value, the detected rotational speed of the engine falls within a first predetermined range, and the detected load on the engine falls within a second predetermined range, at the same time.

Thus, according to the invention, the catalyst deterioration detection is carried out when the engine is in a predetermined operating condition detected by the operating condition-detecting means (engine coolant temperature-detecting means, catalyst temperature-detecting means, engine speed-detecting means, and engine load-detecting means), which is an operating condition suitable for the deterioration detection, whereby accurate results of the catalyst deterioration detection can be obtained.

In alternative form of the invention, the catalyst deterioration-detecting device comprises:

correction value-calculating means for calculating a correction value for correcting the desired air-fuel ratio, based on a difference between the output value from the second exhaust component concentration sensor and a predetermined reference value;

average value-calculating means for calculating an average value of the correction value;

fluctuation width-calculating means for calculating an output fluctuation width with respect to the average value, based on the correction value; and deterioration-determining means for determining whether the catalyst means is deteriorated, based on the average value calculated by the average value-calculating means and the output fluctuation width calculated by the fluctuation width-calculating means.

Therefore, according to the invention, even when the air-fuel ratio correction value is used in place of the output from the second exhaust emission component concentration sensor to calculate the average output value and the fluctuation width thereof, similar excellent results of the Catalyst deterioration detection can be obtained.

The above objects, features, and advantages of the invention will be more apparent from the following detailed description taken in conjunction with the accompanying drawings.

DETAILED DESCRIPTION

The invention will now be described in detail with reference to the drawings showing an embodiment thereof.

Figure 3:
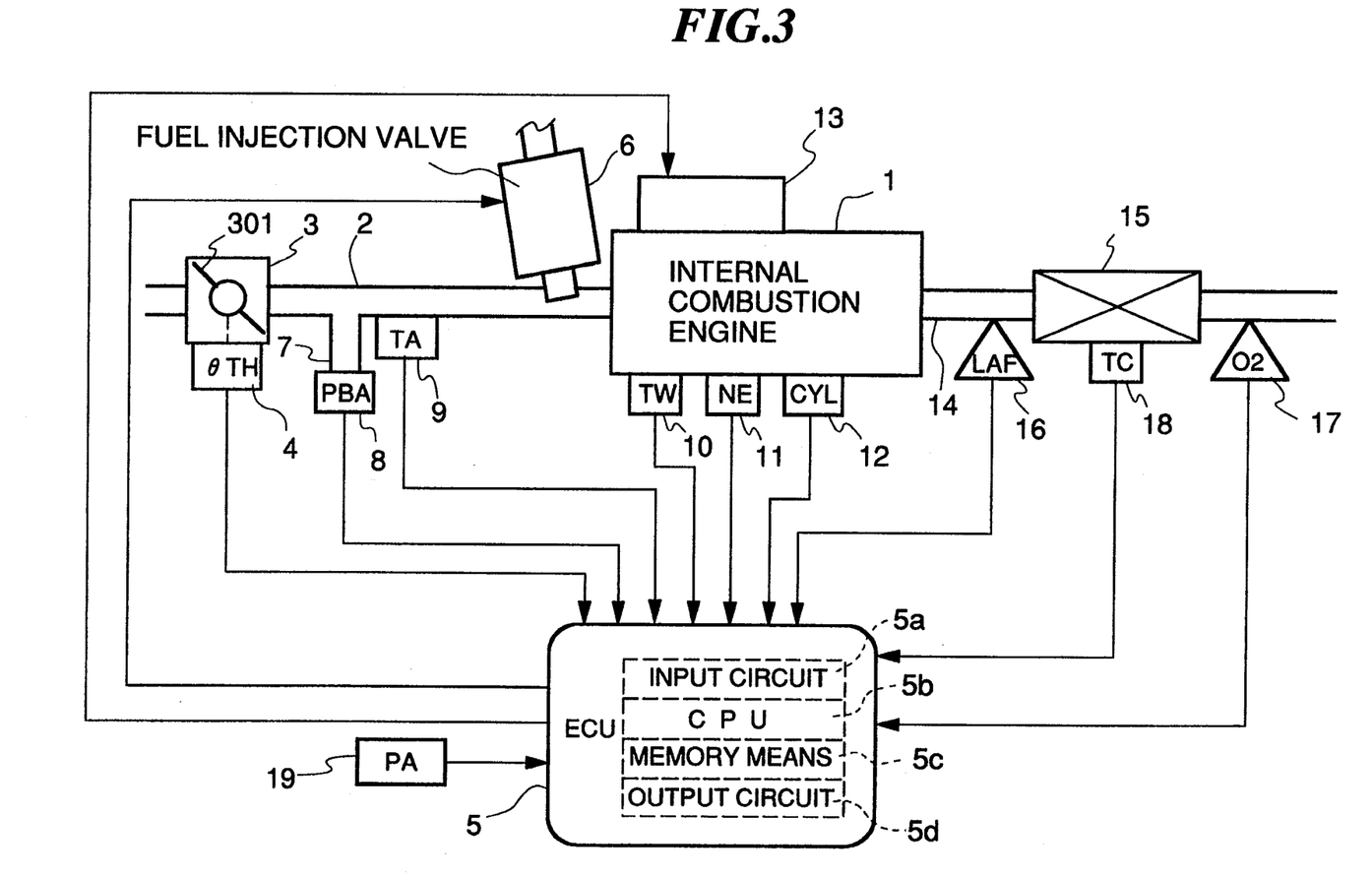
FIG. 3 is a block diagram showing the whole arrangement of an internal combustion engine incorporating a catalyst deterioration-detecting device according to an embodiment of the invention.

Referring first to FIG. 3, there is shown the whole arrangement of an internal combustion engine incorporating a catalyst deterioration-detecting device according to an embodiment of the invention. In the figure, reference numeral 1 designates a DOHC straight type four-cylinder engine (hereinafter simply referred to as "the engine"), each cylinder being provided with a pair of intake valves and a pair of exhaust valves, not shown. Connected to the cylinder block of the engine 1 is an intake pipe 2 across which is arranged a throttle body 3 accommodating a throttle valve 301 therein. A throttle valve opening ($\theta$TH) sensor 4 is connected to the throttle valve 301 for generating an electric signal indicative of the sensed throttle valve opening and supplying same to an electronic control unit (hereinafter referred to as "the ECU") 5.

Fuel injection valves 6, only one of which is shown, are each provided for each of the cylinders, which are inserted into the interior of the intake pipe 2 at locations intermediate between the cylinder block of the engine 1 and the throttle valve 301 and slightly upstream of respective intake valves, not shown. The fuel injection valves 6 are connected to a fuel pump, not shown, and electrically connected to the ECU 5 to have their valve opening periods controlled by signals therefrom.

Further, an intake pipe absolute pressure (PBA) sensor 8 is provided in communication with the interior of the intake pipe 2 via a conduit 7 opening into the intake pipe 2 at a location downstream of the throttle valve 301 for supplying an electric signal indicative of the sensed absolute pressure within the intake pipe 2 to the ECU 5.

An intake air temperature (TA) sensor 9 is inserted into the intake pipe 2 at a location downstream of the conduit 7 for supplying an electric signal indicative of the sensed intake air temperature TA to the ECU 5.

An engine coolant temperature (TW) sensor 10 formed of a thermistor or the like is inserted into a coolant passage filled with a coolant and formed in the cylinder block, for supplying an electric signal indicative of the sensed engine coolant temperature TW to the ECU 5.

An engine rotational speed (NE) sensor 11 and a cylinder-discriminating (CYL) sensor 12 are arranged in facing relation to a camshaft or a crankshaft of the engine 1, neither of which is shown.

The NE sensor 11 generates a pulse as a TDC signal pulse at each of predetermined crank angles whenever the crankshaft rotates through 180 degrees, while the CYL sensor 12 generates a pulse at a predetermined crank angle of a particular cylinder of the engine, both of the pulses being supplied to the ECU 5.

Each cylinder of the engine has a spark plug 13 electrically connected to the ECU 5 to have its ignition timing controlled by a signal therefrom.

A catalytic converter formed by a three-way catalyst (hereinafter referred to as "the catalyst") 15 is arranged in an exhaust pipe 14 of the engine 1. Arranged in a peripheral wall of the catalyst 15 is a catalyst temperature (TC) sensor 18 formed of a thermistor or the like, which supplies a signal indicative of the sensed catalyst temperature TC to the ECU 5.

A LAF sensor 16 as a first exhaust component concentration sensor is arranged in the exhaust pipe 14 at a location upstream of the catalyst 15, and an O2 sensor 17 as a second exhaust component concentration sensor is arranged in the exhaust pipe 14 at a location downstream of the catalyst 15.

The LAF sensor 16 has a sensor element formed of a solid electrolytic material of zirconia (ZrO2) or the like, and two pairs of a cell element and an oxygen pump element mounted on the sensor element at predetermined locations, the pairs being vertically arranged at respective upper and lower locations. The sensor element is electrically connected to an amplifier, not shown. The LAF sensor 16 generates an electric signal substantially proportional to the concentration of oxygen in exhaust gases passing the interior of the sensor element, which signal is supplied to the ECU 5.

The O2 sensor 17 also has a sensor element formed of a solid electrolytic material of zirconia (ZrO2) having a characteristic that an electromotive force thereof drastically or suddenly changes when the air-fuel ratio of the exhaust gases changes across the stoichiometric value, so that an output from the O2 sensor 17 is inverted from a lean value-indicative level to a rich value-indicative level, or vice versa, when the air-fuel ratio changes across the stoichiometric value. More specifically, the O2 sensor 17 generates and supplies a high level signal when the air-fuel ratio of the exhaust gases is rich, and a low level signal when it is lean, to the ECU 5.

An atmospheric pressure (PA) sensor 19 is arranged at a suitable location of the engine 1 and supplies an electric signal indicative of the sensed atmospheric pressure PA to the ECU 5.

The ECU 5 comprises an input circuit 5a having the functions of shaping the waveforms of input signals from various sensors as mentioned above, shifting the voltage levels of sensor output signals to a predetermined level, converting analog signals from analog-output sensors to digital signals, and so forth, a central processing unit (hereinafter referred to as the "the CPU") 5b, memory means 5c formed of a ROM storing various operational programs which are executed by the CPU 5b, and various maps and tables, referred to hereinafter, and a RAM for storing results of calculations therefrom, etc., an output circuit 5d which outputs driving signals to the fuel injection valves 6, and the spark plugs 23.

The ECU 5 constitutes catalyst deterioration-detecting means comprising average value-calculating means for calculating an average output value from the O2 sensor 17, fluctuation width-calculating means for calculating an output fluctuation width of the output from the O2 sensor 17, and deterioration-determining means for determining deterioration of the catalyst, all hereinafter described.

The CPU 5b operates in response to the signals from various sensors described above to determine operating conditions in which the engine 1 is operating, such as an air-fuel ratio feedback control region and open-loop control regions, and calculates, based upon the determined engine operating conditions, the valve opening period or fuel injection period TOUT over which the fuel injection valves 6 are to be opened, by the use of the following equation (1) when the engine is in a basic operating mode, and by the use of the following equation (2) when the engine is in a starting mode, in synchronism with generation of TDC signal pulses, and stores the results of calculation into the memory means 5c (RAM):

$$TOUT = TiM \times KCMDM \times KLAF \times K1 \times K2 \quad (1)$$

$$TOUT = TiCr \times K32 + K4 \quad (2)$$

where TiM represents a basic fuel injection period applied when the engine is in the basic operating mode, which is determined according to the engine rotational speed NE and the intake pipe absolute pressure PBA. A TiM map used in determining a value of TiM is stored in the ROM of the memory means 5c.

TiCR represents a basic fuel injection period applied when the engine is in the starting mode, which is determined according to the engine rotational speed NE and the intake pipe absolute pressure PBA, similarly to TiM. A TiCR map used in determining a value of TiCR is stored in the ROM of the memory means 5c, as well.

KCMDM represents a modified desired air-fuel ratio coefficient, which is set based on a desired air-fuel ratio coefficient KCMD determined based on operating conditions of the engine as well as on air-fuel ratio correction value $\Delta$KCMD determined based on an output from the O2 sensor 17, as will be described later.

KLAF represents an air-fuel ratio correction coefficient, which is set during the air-fuel ratio feedback control such that the air-fuel ratio detected by the LAF sensor 16 becomes equal to a desired air-fuel ratio set by the KCMDM value, and set during the open-loop control to predetermined values depending on operating conditions of the engine.

K1 and K3 represent correction coefficients and K2 and K4 represent correction variables. The correction coefficients and variables K1 to K4 are see depending on operating conditions of the engine to such values as optimize operating characteristics of the engine, such as fuel consumption and accelerability.

Next, details of the air-fuel ratio feedback control executed by the CPU 5b will be described.

Figure 4:
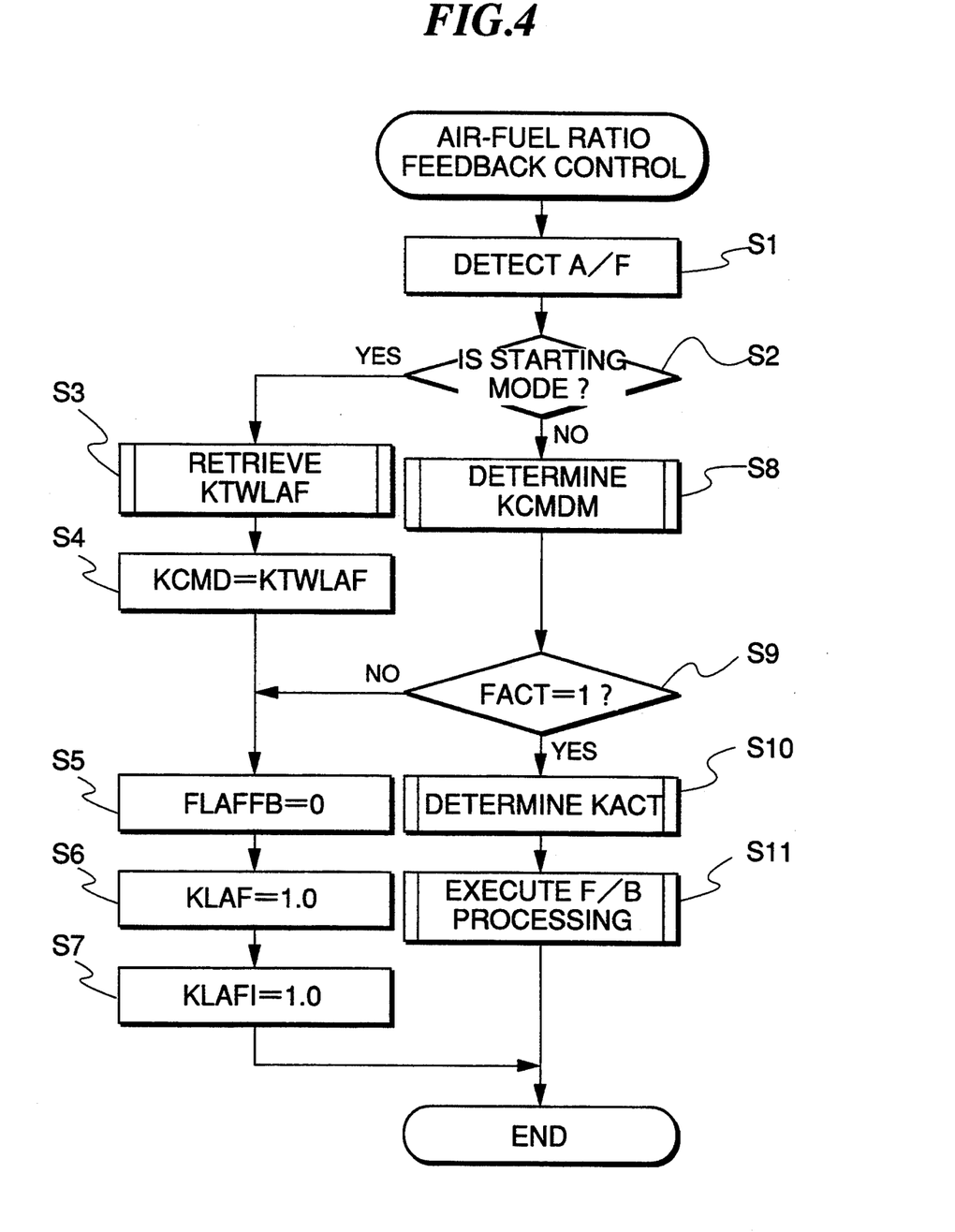
FIG. 4 is a flowchart showing a main routine for carrying out air-fuel ratio feedback control according to the embodiment.

FIG. 4 shows a main routine for carrying out the air-fuel ratio feedback control.

First, at a step S1, an output value from the LAF sensor 16 is read. Then, at a step S2, it is determined whether or not the engine is in the starting mode. The determination of the starting mode is carried out by determining whether or not a starter switch, not shown, of the engine has been turned on, and at the same time the engine rotational speed NE is below a predetermined value (cranking speed).

If the answer to the question of the step S2 is affirmative (YES), i.e. if the engine is in the starting mode, which implies that the engine temperatures is low, and hence a value of a desired air-fuel ratio coefficient KTWLAF suitable for low engine temperature is determined at a step S3 by retrieving a KTWLAF map according to the engine coolant temperature TW and the intake pipe absolute pressure PBA, and the determined KTWLAF value is set to the desired air-fuel ratio coefficient KCMD at a step S4. Then, a flag FLAFFB is set to "0" at a step S5 to inhibit the air-fuel ratio feedback control, and the air-fuel ratio correction coefficient KLAF and an integral term (I term) thereof KLAFI are both set to 1.0 at respective steps S6 and S7, followed by terminating the program.

On the other hand, if the answer to the question of the step S2 is negative (NO), i.e. if the engine is in the basic operating mode, the modified desired air-fuel ratio coefficient KCMDM is determined at a step S8 by a KCMDM-determining routine described hereinafter with reference to FIG. 5, and then it is determined at a step S109 whether or not a flag FACT is equal to "1" in order to judge whether the LAF sensor 16 has been activated. The determination as to whether the LAF sensor 16 has been activated is carried out by the use of another routine, not shown, which is executed as background processing, in which when the difference between an actual value VOUT of the output voltage from the LAF sensor 16 and a predetermined central voltage value VCENT of same is smaller than a predetermined value (e.g. 0.4 V), for instance, it is determined that the LAF sensor 16 has been activated.

Then, if the answer to the question of the step S9 is negative (NO), the program proceeds to the step S5, whereas if the answer to the question of the step S9 is affirmative (YES), i.e. if the LAF sensor 16 has been activated, the program proceeds to a step S10, where an equivalent ratio KACT (14.7/(A/F)) of the air-fuel ratio detected by the LAF sensor 16 (hereinafter referred to as "the detected air-fuel ratio coefficient") is calculated. The detected air-fuel ratio coefficient KACT is calculated to a value based on the intake pipe absolute pressure PBA, the engine rotational speed NE, and the atmospheric pressure PA by the use of a KACT-calculating routine, not shown, because the pressure of exhaust gases varies with these operating parameters of the engine.

Then, at a step S11, a feedback processing routine is executed, followed by terminating program. More specifically, if predetermined feedback control conditions are not satisfied, the flag FLAFFB is set to "0" to inhibit the air-fuel ratio feedback control, whereas if the predetermined feedback control conditions are satisfied, the flag FLAFFB is set to "1", and the air-fuel ratio correction coefficient KLAF is calculated, to execute the air-fuel ratio feedback control, followed by terminating the program.

Figure 5:
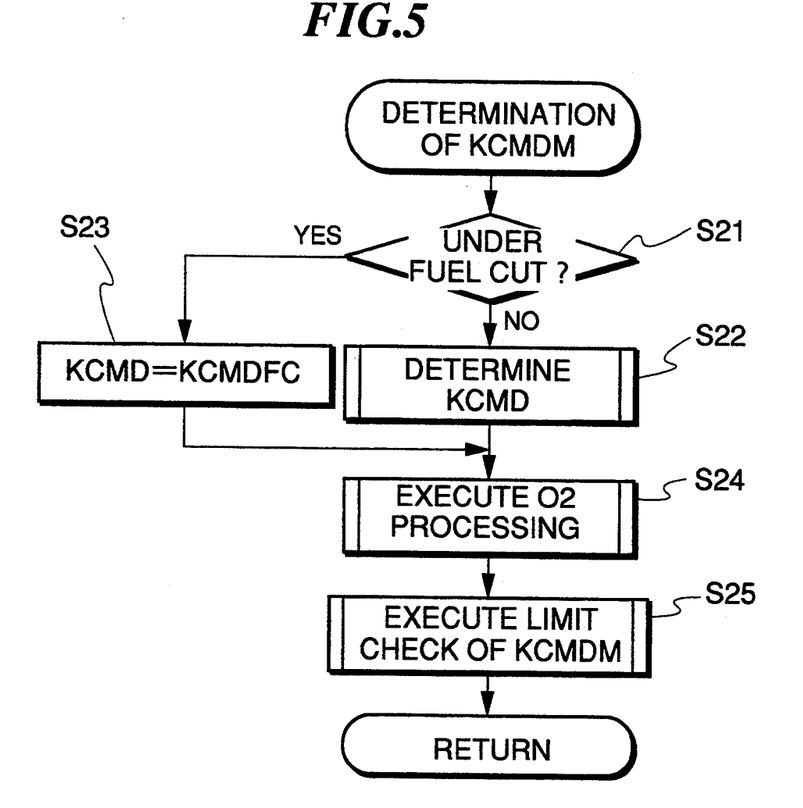
FIG. 5 is a flowchart showing a routine for calculating a modified desired air-fuel ratio coefficient KCMDM applied during the air-fuel ratio feedback control.

FIG. 5 shows the KCMDM-determining routine executed at the step S8 in FIG. 4, which is executed synchronism with generation of TDC signal pulses.

First, at a step S21, it is determined whether or not the engine is under fuel cut. The determination as to fuel cut is carried out based on the engine rotational speed NE and the valve opening $\theta$TH of the throttle valve 301, by a fuel cut-determining routine, not shown.

If the answer to the question of the step S21 is negative (NO), i.e. if the engine is not under fuel cut, the program proceeds to a step S22, where the desired air-fuel ratio coefficient KCMD is determined by a KCMD-determining routine, not shown. The desired air-fuel ratio coefficient KCMD is normally read from a KCMD map according to the engine rotational speed NE and the intake pipe absolute pressure PBA, which map is set such that predetermined KCMD map values are set correspondingly to predetermined values of the engine rotational speed NE and those of the intake pipe absolute pressure PBA. When a vehicle on which the engine is installed is started from its standing position, or when the engine is in a cold condition, or in a predetermined high load condition, a map value read from the KCMD map is corrected to a suitable value. Following the KCMD calculation, the program proceeds to a step S24.

On the other hand, if the answer to the question of the step S21 is affirmative (YES), the desired air-fuel ratio coefficient KCMD is set to a predetermined value KCMDFC (e.g. 1.0) at a step S23, and then the program proceeds to the step S24.

Then, at the step S24, an O2 sensor output processing is carried out. That is, as described hereinafter, when predetermined conditions are satisfied, the desired air-fuel ratio coefficient KCMD is corrected based on the output value from the O2 sensor 17 to obtain the modified desired air-fuel ratio coefficient KCMDM. Then, at a step S25 limit check of the modified desired air-fuel ratio coefficient KCMDM is carried out, followed by terminating the present subroutine to return to the FIG. 4 main routine. More specifically, the KCMDM value calculated at the step S22 is compared with predetermined upper and lower limit values KCMDMH and KCMDML, and if the KCMDM value is larger than the predetermined upper limit value KCMDMH, the former is corrected to the latter, whereas if the KCMDM value is smaller than the predetermined lower limit value KCMDML, the former is corrected to the latter.

Figure 6:
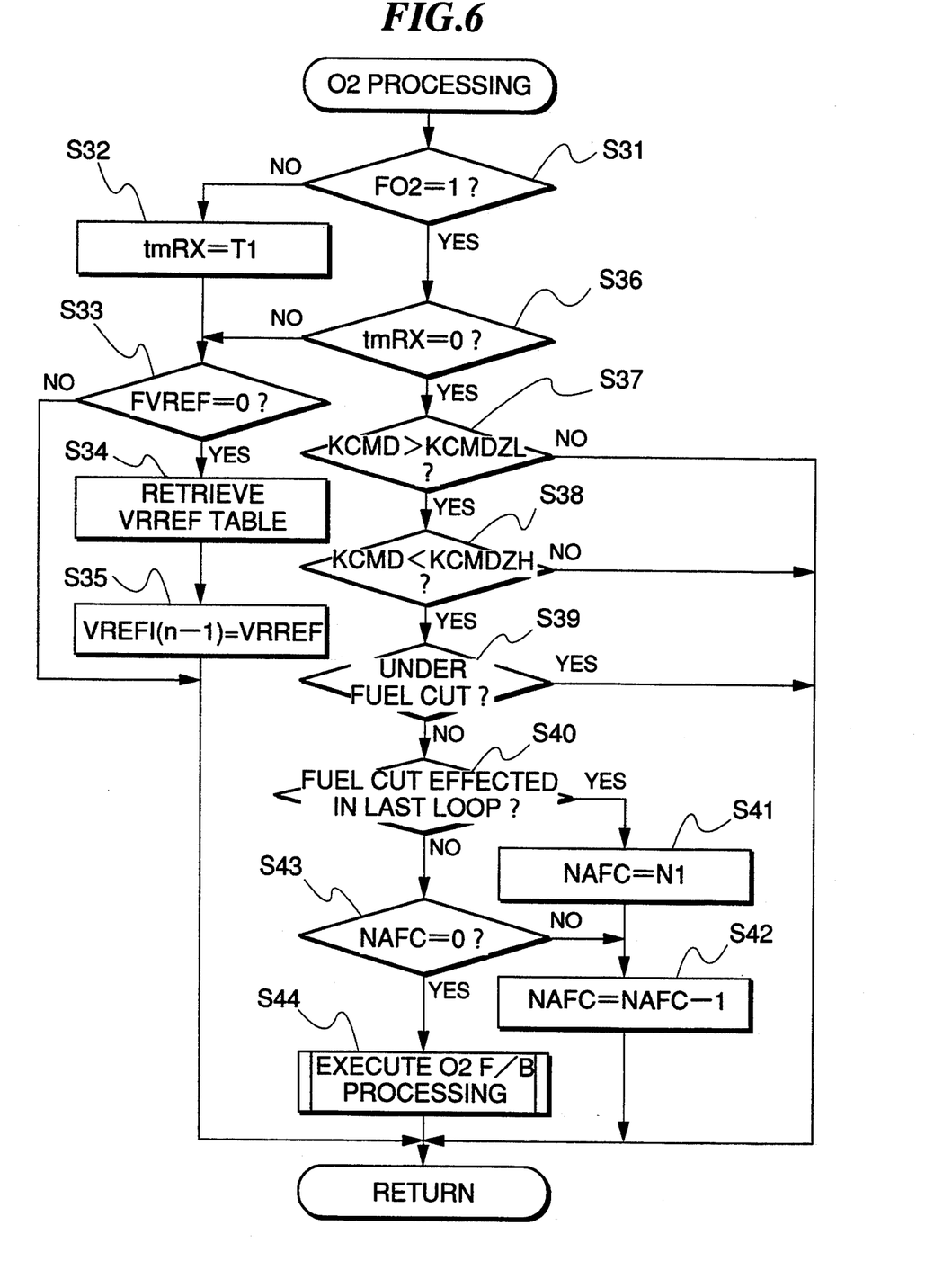
FIG. 6 is a flowchart showing an O2 sensor output processing routine executed during the air-fuel ratio feedback control.

FIG. 6 shows an O2 sensor output processing routine, which is executed at the step S24 in FIG. 5, in synchronism with generation of TDC signal pulses.

First, at a step S31, it is determined whether or not a flag FO2 is equal to "1" to determine whether the O2 sensor 17 has been activated. The determination as to activation of the O2 sensor 17 is carried out by an O2 sensor activation-determining routine, not shown. For example, whether or not the O2 sensor 17 is activated is determined depending on a time period elapsed after an ignition switch, not shown, is closed, or on a time period elapsed after the engine enters the basic operating mode.

If the answer to the question of the step S31 is negative (NO), i.e. if it is determined that the O2 sensor 17 has not been activated, the program proceeds to a step S32, where a timer tmRX is set to a predetermined value T1 (e.g. 0.25 sec.), and then it is determined at a step S33 whether or not a flag FVREF is equal to "0" to thereby determine whether or not a desired value VREF of output voltage VO2 from the O2 sensor 17 has been set to an initial value thereof (hereinafter referred to as "the initial desired value") VRREF for calculation of the air-fuel ratio correction value a $\Delta$KCMD.

In the first loop of execution of the present routine, normally, the answer to the question of the step S33 is affirmative (YES) (FVREF=0), the program proceeds to a step S34, where a VRREF table, not shown, stored in the ROM of the memory means 5c is retrieved to determine the initial desired value VRREF. The VRREF table is set in accordance with the atmospheric pressure PA sensed by the PA sensor 19. The initial desired value VRREF is determined by being read from the VRREF table and additionally by interpolation, if required.

Then, at a step S35, an integral term (I term) VREFI(n-1) of the desired value VREF in the immediately preceding loop is set to the initial desired value VRREF, and then this subroutine is terminated, followed by the program returning to the FIG. 4 main routine. In the following loops, the answer to the question the step S33 is negative (NO), since the desired value VREF has already been set to the initial desired value VRREF as described above, so that the present routine is immediately terminated without executing the steeps S34 and S35.

Further, if the answer to the question of the step S31 is affirmative (YES), it is judged that the O2 sensor 17 has been activated, and then the program proceeds to a step S36, where it is determined whether or not the count value of the timer tmRX is equal to "0". If the answer to this question is negative the program proceeds to the step S33, whereas if the answer is affirmative (YES), it is judged that the activation of the O2 sensor 17 has been completed, and then the program proceeds to steps S37 and S38, where it is determined whether or not the desired air-fuel ratio coefficient KCMD set at the step S22 or S23 the FIG. 5 routine is larger than a predetermined lower limit value KCMDZL (e.g. 0.98) and is smaller than a predetermined upper limit value KCMDZH (e.g. 1.13).

If the answer to the question of the step S37 or S38 is negative (NO), it means that the air-fuel ratio of the mixture has been controlled to a value suitable for a so-called lean-burn state or to a rich value, and then the present routine is immediately terminated, whereas if the answers at the steps S37 and S38 are both affirmative (YES), it is judged that the air-fuel ratio of the mixture is to be controlled to the stoichiometric value (A/F=14.7), so that the program proceeds to a step S39, where it is determined whether or not the engine is under fuel cut. If the answer to this question is affirmative (YES), the present routine is immediately terminated to return to the FIG. 4 main routine, whereas if the answer is negative (NO), it is determined at a step S40 whether or not the engine was under fuel cut in the immediately preceding loop. If the answer to this question is affirmative (YES), a count value NAFC of a counter NAFC is set to a predetermined value N1 (e.g. 4) at a step S41, and the count value NAFC is decreased by a decremental value of "1" at a step S42, followed by terminating the present routine.

On the other hand, if the answer to the question of the step S40 is negative (NO), the program proceeds to a step S43, where is is determined whether or not the count value NAFC of the counter NAFC is equal to "0". If the answer to this question is negative (NO), the program proceeds to the step S42, whereas if the answer is affirmative (YES), it is judged that the fuel supply has been stabilized after termination of fuel cut, and the program proceeds to a step S44, where the O2 feedback processing is executed, followed by terminating the present routine to return to the FIG. 4 main routine.

Figure 7:
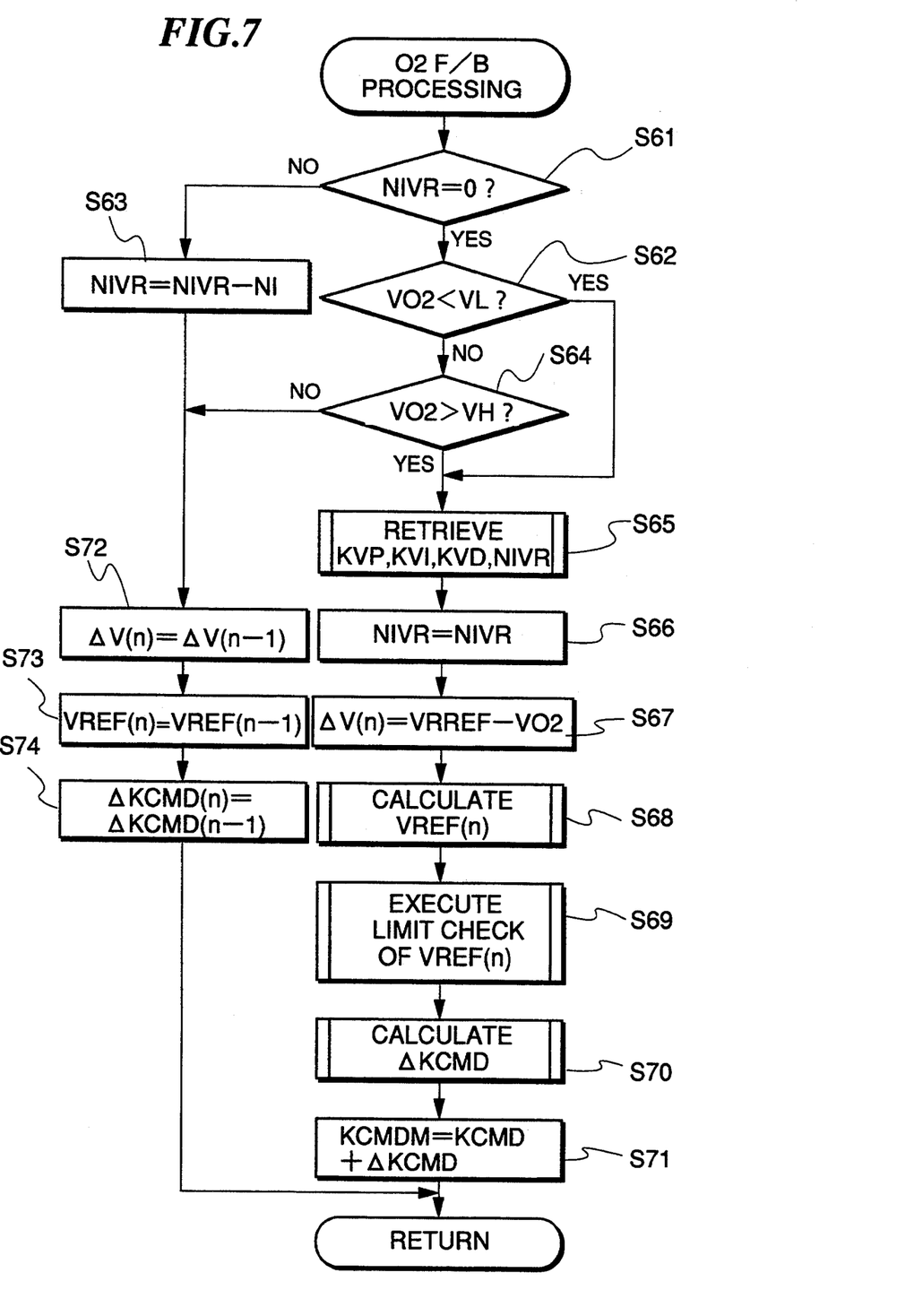
FIG. 7 is a flowchart showing an O2 feedback processing (O2 sensor output-responsive air-fuel ratio feedback control) routine executed during the air-fuel ratio control.

FIG. 7 shows an O2 feedback processing routine which is executed at the step S44 of the FIG. 6 routine, in synchronism with generation of TDC signal pulses.

First, at a step S61, it is determined whether or not a thinning-out variable NIVR is equal to "0" The thinning-out variable NIVR is reduced to 0 whenever a number of TDC signal pulses are generated, which corresponds to a thinning-out number NI, which is set depending on operating conditions of the engine as will be described later. The answer to the question of the step S61 in the first loop of execution of the present routine is affirmative (YES), since the variable NIVR has not been set to the number NI, so that the program proceeds to a step S62.

Further, if the answer to the question of the step S61 becomes negative in a subsequent loop, the program proceeds to a step S63, where a decremental value of 1 is subtracted from the thinning-out variable NIVR, followed by the program proceeding to a step S72, referred to hereinafter.

At the step S62, it is determined whether or not the output voltage VO2 from the O2 sensor 17 is lower than a predetermined lower limit value VL (e.g. 0.3V). If the answer to this question is affirmative (YES), it is judged that the air-fuel ratio of the mixture is deviated from the stoichiometric value to a leaner value, so that the program proceeds to a step S65, whereas if the answer is negative (NO), the program proceeds to a step S64, where it is determined whether or not the output voltage VO2 from the O2 sensor 17 is higher than a predetermined upper limit value (e.g. 0.8). If the answer to this question is affirmative (YES), it is judged that the air-fuel ratio of the mixture is deviated from the stoichiometric value to a richer value, so that the program proceeds to the step S65.

At the step S65, a KVP map, a KVI map, a KVD map, and an NI map, none of which are shown, are retrieved to determine control parameters indicative a rate of change in the O2 feedback control amount, i.e. a proportional term (P term) coefficient KVP, an integral term (I term) coefficient KVI, and a differential term (D term) coefficient KVD, and the aforementioned thinning-out number NI. The KVP map, the KVI map, the KVD map, and the NI map are set such that predetermined map values are provided, respectively, for a plurality of engine operating regions determined by the engine rotational speed NE and the intake pipe absolute pressure PBA. The KVP, KVI, KVD, and NI values are determined by being read from the respective maps and additionally by interpolation, if required.

Then, at a step S66, the thinning-out variable NIVR is set to the value or number NI determined at the step S65, and then the program proceeds to a step S67 where there is calculated a difference $\Delta V(n)$ between the initial desired value VRREF determined at the step S34 of the FIG. 6 routine and the output voltage VO2 from the O2 sensor 17 detected in the present loop.

Then, at a step S68, desired values VREFP(n), VREFI(n), and VREFD(n) of the respective correction terms, i.e. P term, I term, and D term, are calculated by the use of the following equations (3) to (5):

$$VREFP(n) = \Delta V(n) \times KVP \qquad (3)$$

$$VREFI(n) = VREF + \Delta V(n) \qquad (4)$$

$$VREFD(n) = (\Delta V(n) - \Delta V(n-1)) \times KVD \qquad (5)$$

Then, these calculated desired values are added together by the use of the following equation (6), to determine the desired value VREF(n) of the outpost voltage VO2 from the O2 sensor 17 used in the O2 feedback control, at the step S68:

$$VREF(n) = VREFP(n) + VREFI(n) + VREFD(n) \qquad (6)$$

Then, at a step S69, limit check of the desired value VREF(n) determined at the step S68 is carried out. Specifically, the value VREF(n) is compared with predetermined upper and lower limit values VREFH, VREFL. When VREF(n) exceeds VREFH, the former is set to the latter, while when VREF(n) is below VREFL, the former is set to the latter.

Figure 8:
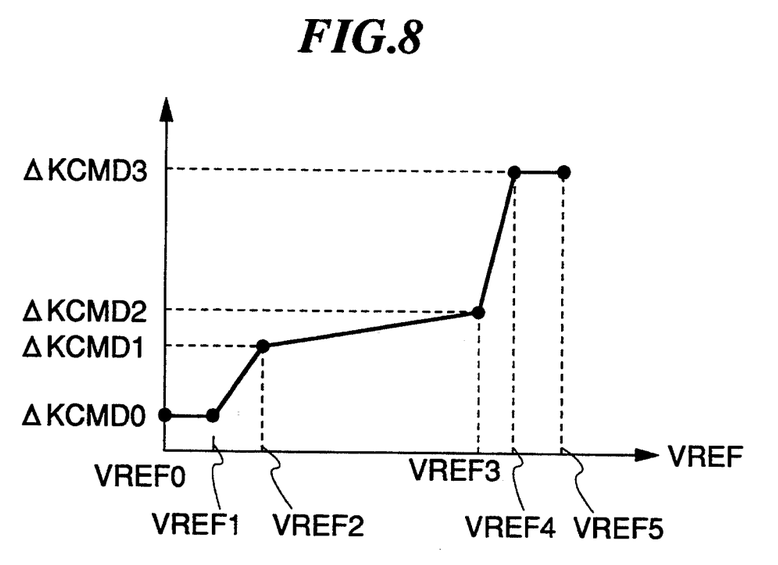
FIG. 8 shows a table for determining an air-fuel ratio correction value a ΔKCMD, which is retrieved in the control-routine of FIG. 7.

After the limit check of the desired value VREF(n) is executed, the program proceeds to a seep S70, where the air-fuel ratio correction value $\Delta$KCHD is determined by retrieving a a $\Delta$KCHD table. The $\Delta$KCHD table is set as shown in FIG. 8, such that table values $\Delta$KCMDO-$\Delta$KCMD3 are provided in a manner corresponding, respectively, to desired correction values VREF0-VREF5. The a $\Delta$KCMD value is determined by being read from the map and additionally by interpolation, if required. As is clear from FIG. 8, as the VREF(n) value is larger, a larger $\Delta$KCHD value is read. Since the VREF value is subjected to limit check at the step S69, the a $\Delta$KCMD value read falls between predetermined upper and lower limit values.

Then, at a step S71, the air-fuel ratio correction value a $\Delta$KCHD is added to the desired air-fuel ratio correction coefficient KCHD determined at the step S22 in FIG. 5 to obtain the modified desired air-fuel ratio coefficient KCMDM (equivalent to the stoichiometric air-fuel ratio in the present embodiment), followed by terminating this routine.

On the other hand, if the answers to the questions of the steps S63 and S64 are both negative (NO), i.e. if the output voltage VO2 from the O2 sensor 17 is equal to or higher than the predetermined lower limit value VL but equal to or lower than the predetermined higher limit value VH, i.e. if $VL \leq VO2 \leq VH$, the O2 feedback control is inhibited, and hence the program proceeds to steps S72 to S74, where the aforementioned difference a ΔV (between VRREF and VO2), the desired value VREF, and the air-fuel ratio correction value a ΔKCMD are held at the respective values assumed in the immediately preceding loop, followed by terminating the program. This prevents the O2 feedback control from being unnecessarily carried out when the air-fuel ratio of the mixture is determined to remain substantially equal to the stoichiometric value, to thereby attain excellent controllability, that is, to stabilize the air-fuel ratio of the mixture.

Next, details of the method of detecting deterioration of the catalyst 15 according to the present embodiment will be described with reference to FIGS. 9 and 10.

Figure 9:
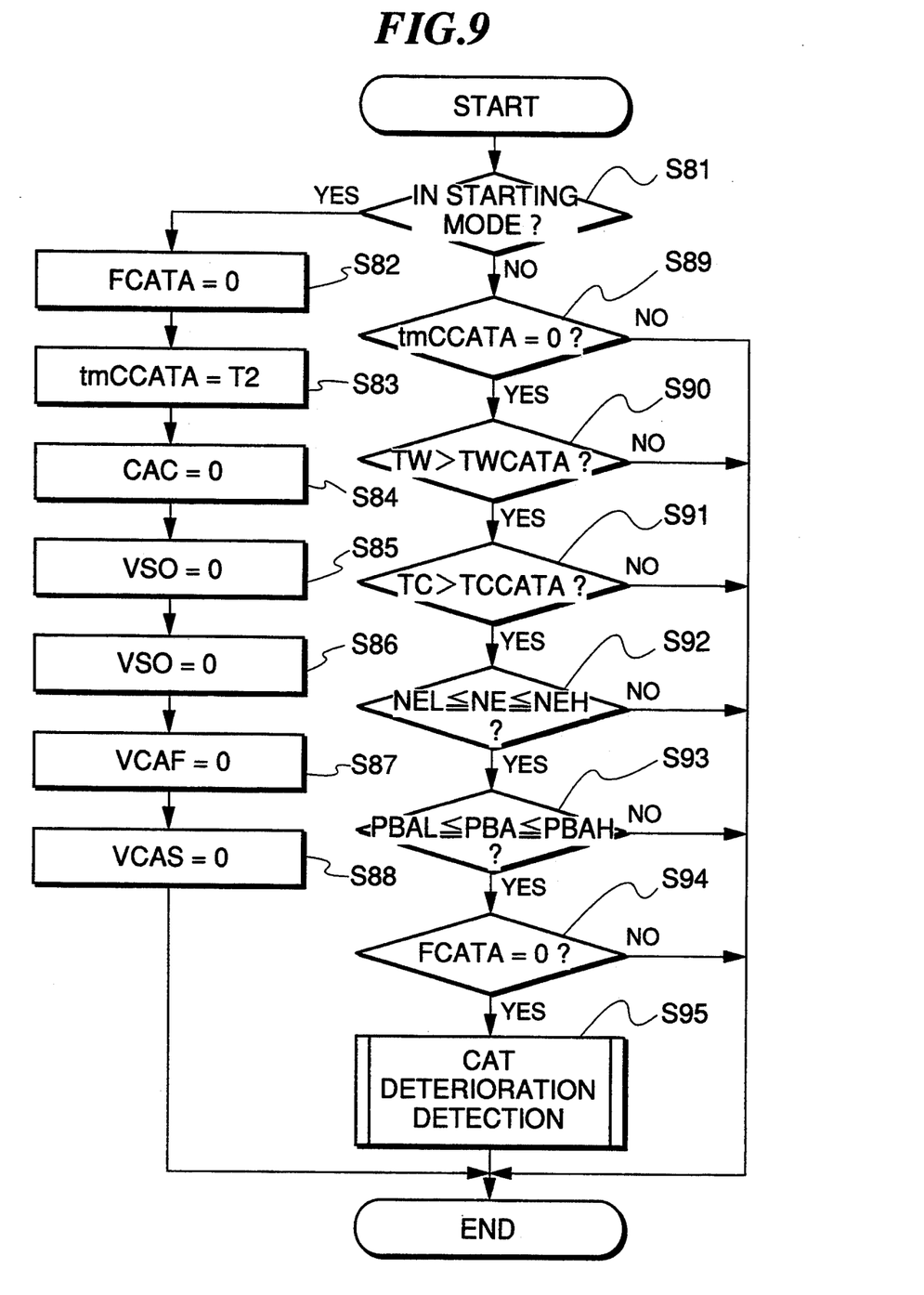
FIG. 9 is a flowchart showing a main routine for carrying out detection of deterioration of a catalyst appearing in FIG. 3 according to the embodiment.

FIG. 9 shows a main routine for carrying out detection of deterioration of the catalyst which is executed by the CPU 5b in synchronism with generation of TDC signal pulses.

First, at a step S81, it is determined whether or not the engine is in starting mode. This determination is made in a similar manner to that at the step S2 in FIG. 4.

If the answer to the question of the step S81 is affirmative (YES), i.e. if the engine is in the starting mode, the catalyst deterioration detection is inhibited, and a deterioration detection flag FCATA is set to "0" at a step S82, and a timer tmCCATA which measures a time period elapsed from the start of the engine is set to a predetermined time period T2 (e. g. 120 sec) at a step S83. Then, a determination time period variable CAC for calculation of an average value, etc., the average value VAO of the output value VO2 from the O2 sensor 17, a variance value VSO, an integrated value VCAF of the output value VO2, and a squared integrated value VCAS of the output VO2 are all set to "0" at steps S84–S88, followed by terminating the routine.

On the other hand, if the answer to the question of the step S81 is affirmative (YES), i.e. if the engine is in the basic operating mode, it is determined at a step S89 whether or not the timer tmCCATA has become "0" If the answer is affirmative (YES), means that the predetermined time period T2 has already elapsed, and then, it is determined at a step S90 whether or not the engine coolant temperature TW sensed by the TW sensor 10 is higher than a predetermined lower limit value TWCATA (e.g. 80° C.). If the answer is affirmative (YES), it is judged that the engine has been warmed up, and then it is determined at a step S90 whether or not the catalyst bed temperature TC sensed by the TC sensor 18 is higher than a predetermined lower limit value TCCATA (e.g. 380° C.). If the answer is is affirmative (YES), i.e. if the catalyst 15 has been activated, the program proceeds to a step S92 where it is determined whether the engine rotational speed NE sensed by the NE sensor 11 falls within a predetermined range defined by a predetermined lower limit NEL (e.g. 1800 rpm) and a predetermined higher limit NEH (e.g. 3000 rpm). If the answer is affirmative (YES), i.e. if of parameter conditions for determining an engine steady operating condition is satisfied, it is then determined at a step S93 whether or not the intake pipe absolute pressure PBA sensed by the PBA sensor 8 falls within a predetermined range defined by a predetermined lower limit PBAL (e.g. 260 mmHg) and a predetermined higher limit PBAH (e.g. 560 mmHg).

Figure 10:
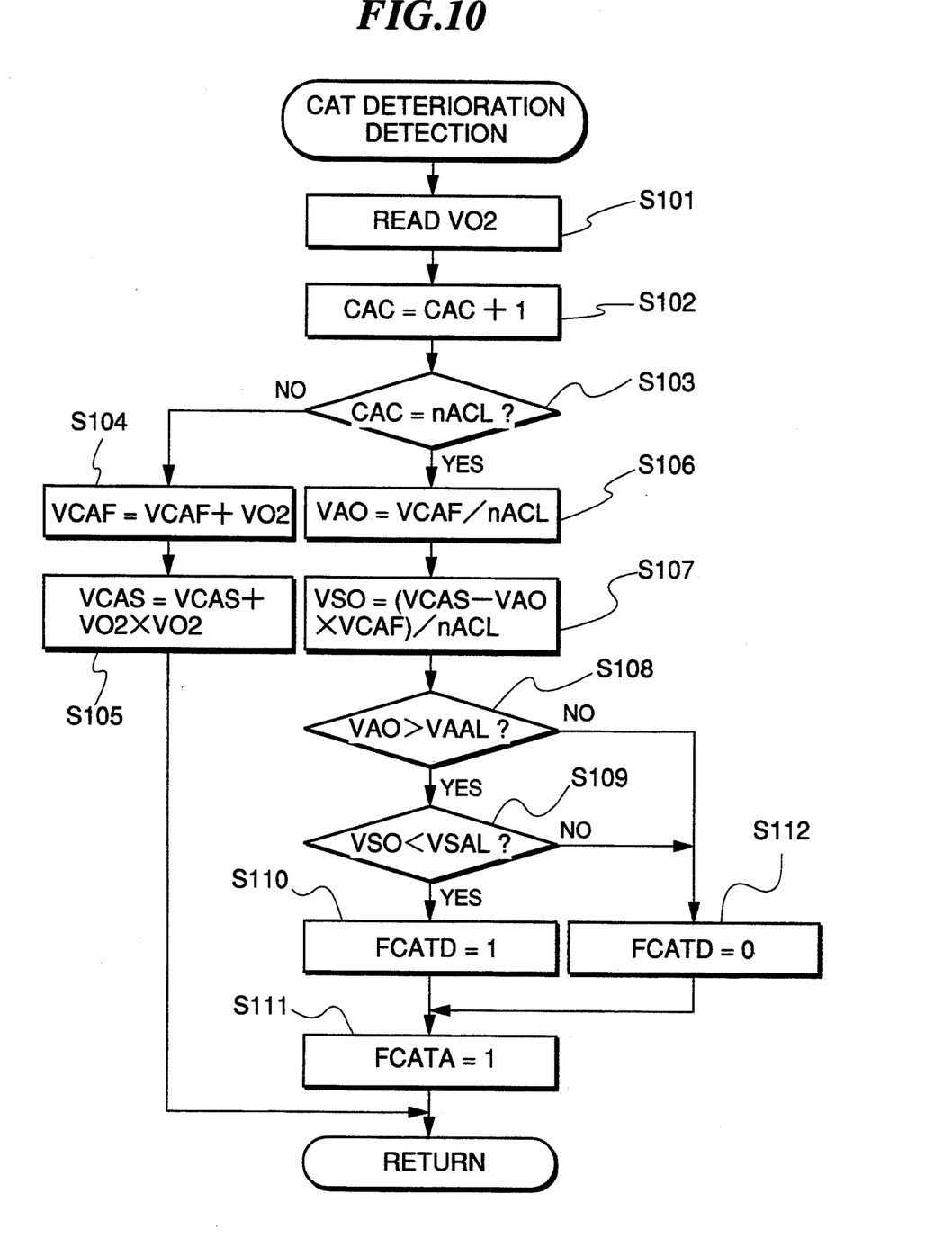
FIG. 10 is a flowchart showing a routine for detecting deterioration of the catalyst, which is executed during execution of the main routine of FIG. 9.

If the answer to the question of the step S93 is affirmative (YES), i.e. if the parameter condition satisfying the engine steady condition is satisfied, the program proceeds to a step S94 where it is determined whether or not the deterioration detection flag FCATA is set to "0" If it is set to "0", i.e. if the catalyst deterioration detection has not yet been carried out, a catalyst deterioration-detecting routine in FIG. 10 is executed at a step S95, followed by terminating the program.

If the answer to the question of any of the steps S89 to S94 is negative (NO), the program is immediately terminated without carrying out the catalyst deterioration detection.

According to the FIG. 9 main routine, the catalyst deterioration detection is carried out by the routine in FIG. 10 only when a predetermined time period has elapsed after the start of the engine, the engine is in a predetermined operating condition wherein the engine coolant temperature TW and the catalyst bed temperature TC are higher than respective predetermined values, and at the same time the engine rotational speed NE and the intake pipe absolute pressure PBA are within respective predetermined ranges, and the catalyst deterioration detection has not been carried out after the start of the engine. Since the catalyst deterioration detection is carried out when the engine is in the predetermined operating condition in which the catalyst deterioration detection can be made by the use of the output from the O2 sensor which is then stable, i.e. when the air-fuel ratio feedback control is being effected, accurate detection results can be obtained. Further, when the answer at the step S94 is negative (NO), it means that the catalyst deterioration-detection has already been carried out deteriorated, making it unnecessary to again carry out the deterioration detection and hence the program is immediately terminated.

FIG. 10 shows details of the catalyst deterioration detection routine which is executed at the step S95 in the FIG. 9 main routine in synchronism with generation of TDC signal pulses.

First, at a step S101, the output value VO2 from the O2 sensor 17 is read in, and the determination time period variable CAC is incremented by 1 at a step S102, followed by the program proceeding to a step S103 where it is determined whether or not the determination time period variable CAC has reached a predetermined value nACL. The predetermined value nACL is set at a value corresponding to a sufficiently long time period within which the average value can be calculated (e.g. 1024).

In the first loop of execution of the present routine, the answer to the question of the step S103 is negative (NO), the program then proceeds to a step S104 where a present value of the VO2 output value of the O2 sensor 17 is added to the value of VCAF set at the step S87 in FIG. 9 to obtain a present value of the integrated value VCAF. Then, at a step S105 a present value of the VO2 output value squared is added to the squared integrated value VCAS (=0) set at the step S88 in FIG. 9 to obtain a new squared integrated value VCAS, followed by terminating the program and returning to the FIG. 9 main routine.

When the program proceeds to the steps S104 et. seq. in the following loop or a subsequent loop, a present value of the VO2 output value is added to an immediately preceding value of the integrated value VCAF calculated in the immediately preceding loop to obtain a present value of the integrated value VCAF at the step S104, and then a present value of the VO2 output value squared is added to an immediately preceding value of the squared integrated value VCAS to obtain a new squared integrated value VCAS.

On the other hand, if the answer to the question of the step S103 becomes affirmative (YES), the program proceeds to a step S106 where the average value VAO is calculated by the use of the following equation (7), and then the variance value VSO is calculated by the use of the following equation (8) at a step S107:

$$VAO = VCAF/nACL \qquad (7)$$

$$VSO = (VCAS - VAO \times VCAF)/nACL \qquad (8)$$

Then, at a step S108 it is determined whether or not the average value VAO calculated at the step S1(16 is larger than a predetermined lower limit value VAAL (e.g. 0.4 volts). If the answer is affirmative (YES), it is determined at a step S109 whether the variance value VSO calculated at the step S107 is smaller than a predetermined lower limit value VSAL (e.g. 0.1 volts). If the answers at the steps S108 and S109 are both affirmative (YES), i.e. VAO>VAAL and VSO<VSAL, it means that the average output value from the O2 sensor 17 is relatively high and its output fluctuation width is relatively small. Accordingly, it is judged that the catalyst 15 is not deteriorated, and then a flag FCATD indicative of deterioration of the catalyst when set to 1 is set to "0" to indicate normality of the catalyst, at a step S110, and the deterioration detection flag FCATA is set to "1" at a step S111, followed by terminating the program and returning to the FIG. 9 main routine.

One the other hand, if the answer to the question of one of the steps S108 and S109 is negative (NO), i.e. if VAO≦VAAL or VSO≧VSAL, it means that the average output value of the O2 sensor 17 is relatively low, or the output fluctuation width relatively large. Accordingly, it is judged that the catalyst is not deteriorated, and then the flag FCATD is set to "0" at a step S112, and the flag FCATA is see to "1" at a step S111, followed by terminating the program and returning to the FIG. 9 main routine.

In the above described manner, according to the present embodiment, the variance value VSO is calculated to determine the output fluctuation width the O2 sensor 17, and it is judged that the catalyst 15 is deteriorated when the average output value VAO of the O2 sensor 17 is smaller than the predetermined value VAAL, or when the output fluctuation width (VSO) is larger than the predetermined value VSAL.

Therefore, the catalyst deterioration-detecting device according to the embodiment is capable of carrying out the catalyst deterioration detection while at the same time the air-fuel ratio feedback control is being effected, that is, while securing required air-fuel ratio feedback control performance and hence without causing a degradation in the exhaust emission characteristics. Besides, it is no longer necessary measure a time period elapsed before the output level of the O2 sensor is inverted, thus shortening the time required for the catalyst deterioration detection.

In the above described embodiment, the air-fuel ratio correction value a ΔKCMD may be employed in place of the output value VO2 from the O2 sensor. In this alternative case, advantageously the average value VAO and variance value VSO for determination of the catalyst deterioration may be replaced by an average value of the air-fuel ratio correction value a ΔKCMD send a variance value thereof, which are calculated when VO2 <VL or VO2>VH, providing similar detection results to the above described embodiment.

Moreover, a standard deviation may be employed in place of the variance value to determine the output fluctuation width of the O2 sensor 17. In this alternative case, advantageously an average value the output value VO2 of the O2 sensor (or the air-feel ratio correction value a ΔKCMD) and a standard deviation thereof are calculated, and the calculated average value and standard deviation are compared with respective predetermined values to thereby evaluate deterioration of the catalyst.

The invention is not limited to the above described embodiment and modifications thereof, but any variations and modifications are possible within the scope of the appended claims without departing from the spirit of the invention. For example, although in the above described embodiment, a single catalyst is provided, the catalyst deterioration-detecting device according to the invention may be applied to an internal combustion engine which is provided with a first catalyst and a second catalyst, wherein detect,on of the catalyst deterioration may be carried out by the use of an average value and an output fluctuation width value of an output value from an O2 sensor arranged between the two catalysts, or those of an air-fuel ratio correction value based on the sensor output value.

What is claimed is:

1. A catalyst deterioration-detecting device for an internal combustion engine having an exhaust passage, at least one catalyst means arranged in said exhaust passage for purifying exhaust gases emitted from said engine, a first exhaust component concentration sensor arranged in said exhaust passage upstream of said catalyst means, for detecting concentration of a specific component in said exhaust gases, a second exhaust component concentration sensor arranged in said exhaust passage downstream of said catalyst means, for detecting concentration of said specific component, operating condition-detecting means for detecting operating conditions of said engine, desired air-fuel ratio-calculating means for calculating a desired air-fuel ratio of a mixture supplied to said engine in response to operating conditions of said engine detected by said operating condition-detecting means, correction means for correcting said desired air-fuel ratio based on an output value from said second exhaust component concentration sensor, and control means for feedback-controlling an air-fuel ratio of a mixture supplied to said engine to the corrected desired air-fuel ratio in response to said concentration of said specific component detected by said first exhaust component concentration sensor, the catalyst deterioration-detecting device comprising:

average value-calculating means for calculating an average value of said output value from said second exhaust component concentration sensor;

fluctuation width-calculating means for calculating an output fluctuation width with respect to said average value, based on said output value from said second exhaust component concentration sensor; and deterioration-determining means for determining whether said catalyst means is deteriorated, based on said average value calculated by said average value-calculating means and said output fluctuation width calculated by said fluctuation width-calculating means.

2. A catalyst deterioration-detecting device as claimed in claim 1, wherein detection of deterioration of said catalyst means is carried out when an operating condition of said engine detected by said operating condition-detecting means is a predetermined operating condition.

3. A catalyst deterioration-detecting device as claimed in claim 1 or 2, wherein said operating condition-detecting means at least comprises coolant temperature-detecting means for detecting coolant temperature of said engine, catalyst temperature-detecting means for detecting temperature of said catalyst means, engine speed-calculating means for detecting rotational speed of said engine, and engine load-detecting means for detecting load on said engine.

4. A catalyst deterioration-detecting device as claimed in claim 3, wherein detection of deterioration of said catalyst means is carried out when the detected coolant temperature of said engine exceeds a first predetermined value, the detected temperature of said catalyst means exceeds a second predetermined value, the detected rotational speed of said engine falls within a first predetermined range, and the detected load on said engine falls within a second predetermined range, at the same time.

5. A catalyst deterioration-detecting device as claimed in claim 1, wherein said first exhaust component concentration sensor has an output characteristic such that an output level thereof is substantially proportional to the concentration of said specific component in said exhaust gases.

6. A catalyst deterioration-detecting device as claimed in claim 1, wherein said second exhaust component concentration sensor has an output characteristic such that an output level thereof is inverted as an air-fuel ratio of said exhaust gases changes across a stoichiometric air-fuel ratio.

7. A catalyst deterioration-detecting device as claimed in claim 1, wherein said fluctuation width-calculating means calculates a variance value from said average value of said output value from said second exhaust component concentration sensor, as a parameter indicative of said output fluctuation width.

8. A catalyst deterioration-detecting device as claimed in claim 1, wherein said fluctuation width-calculating means calculates a standard deviation from said average value of said output value from said second exhaust component concentration sensor, as a parameter indicative of said output fluctuation width.

9. A catalyst deterioration-detecting device for an internal combustion engine having an exhaust passage, at least one catalyst means arranged in said exhaust passage for purifying exhaust gases emitted from said engine, a first exhaust component concentration sensor arranged in said exhaust passage upstream of said catalyst means, for detecting concentration of a specific component in said exhaust gases, a second exhaust component concentration sensor arranged in said exhaust passage downstream of said catalyst means, for detecting concentration of said specific component, operating condition-detecting means for detecting operating conditions of said engine, desired air-fuel ratio-calculating means for calculating a desired air-fuel ratio of a mixture supplied to said engine in response to operating conditions of said engine detected by said operating condition-detecting means, correction means for correcting said air-fuel ratio based on an output value from said second exhaust component concentration sensor, and control means for feedback-controlling an air-fuel ratio of a mixture supplied to said engine to the corrected desired air-fuel ratio in response to said concentration of said specific component detected by said first exhaust component concentration sensor, the catalyst deterioration-detecting device comprising:

correction value-calculating means for calculating a correction value for correcting said desired air-fuel ratio, based on a difference between said output value from said second exhaust component concentration sensor and a predetermined reference value;

average value-calculating means for calculating an average value of said correction value;

fluctuation width-calculating means for calculating an output fluctuation width with respect to said average value, based on said correction value; and deterioration-determining means for determining whether said catalyst means is deteriorated, based on said average value calculated by said average value-calculating means and said output fluctuation width calculated by said fluctuation width-calculating means.

* * * * *